(12) United States Patent
Cheng et al.

(10) Patent No.: US 9,134,557 B2
(45) Date of Patent: Sep. 15, 2015

(54) BACK FRAME AND BACKLIGHT SYSTEM OF FLAT PANEL DISPLAY DEVICE

(75) Inventors: Jia-He Cheng, Shenzhen (CN); Chong Huang, Shenzhen (CN); Yi-Cheng Kuo, Shenzhen (CN); Yu-Chun Hsiao, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 67 days.

(21) Appl. No.: 13/381,092

(22) PCT Filed: Nov. 24, 2011

(86) PCT No.: PCT/CN2011/082791
§ 371 (c)(1),
(2), (4) Date: Dec. 28, 2011

(87) PCT Pub. No.: WO2013/071606
PCT Pub. Date: May 23, 2013

(65) Prior Publication Data
US 2013/0128425 A1    May 23, 2013

(30) Foreign Application Priority Data
Nov. 18, 2011  (CN) .......................... 2011 1 0366533

(51) Int. Cl.
*G02F 1/1333* (2006.01)
*G02F 1/1335* (2006.01)

(52) U.S. Cl.
CPC .... *G02F 1/133308* (2013.01); *G02F 1/133608* (2013.01); *G02F 2001/133314* (2013.01)

(58) Field of Classification Search
USPC .............. 362/632–634, 418, 424; 349/58–60; 248/200, 670
See application file for complete search history.

(56) References Cited

U.S. PATENT DOCUMENTS 1,792,612 A  *  2/1931  Staley ............................ 269/55
4,110,932 A  *  9/1978  Brass ............................. 446/86
(Continued)

FOREIGN PATENT DOCUMENTS

CN       2737123 Y      10/2005
CN       2737129 Y      10/2005
(Continued)

*Primary Examiner* — Laura Tso
(74) *Attorney, Agent, or Firm* — Cheng-Ju Chiang

(57) ABSTRACT

The present invention provides a back frame of a flat panel display device. The back frame includes at least two assembling pieces. The at least two assembling pieces are joined to form the back frame. The back frame further includes a bracing piece that is fixed to the assembling pieces, wherein the assembling pieces are mountable to at least two different positions of the bracing piece in a lengthwise direction of the bracing piece and the bracing piece is mountable to at least two different positions of the assembling pieces in a lengthwise direction of the assembling piece. The present invention also provides a backlight system. The back frame and the backlight system of the flat panel display device of the present invention have a simple structure of mold for the back frame, reduce the cost of back frame mold, save the material used for back frame, and thus lower down the manufacturing cost of flat panel display device. Further, by making the mounting position of a bracing piece to an assembling piece adjustable in a two-dimensional manner, a single bracing piece may meet different needs for mounting so as to further reduce the manufacturing cost of the flat panel display device.

12 Claims, 13 Drawing Sheets

(56) References Cited

U.S. PATENT DOCUMENTS

| | | | |
|---|---|---|---|
| 5,957,574 A * | 9/1999 | Hentz et al. | 362/365 |
| 6,484,980 B2 * | 11/2002 | Medlin et al. | 248/205.1 |
| 7,116,386 B2 * | 10/2006 | Lee et al. | 349/58 |
| 7,874,539 B2 * | 1/2011 | Wright et al. | 248/547 |
| 2002/0075667 A1 * | 6/2002 | Kawashima et al. | 362/26 |
| 2011/0304794 A1 * | 12/2011 | Noh et al. | 349/62 |

FOREIGN PATENT DOCUMENTS

| | | |
|---|---|---|
| CN | 101150942 A | 3/2008 |
| CN | 201115024 Y | 9/2008 |
| CN | 201672468 U | 12/2010 |
| CN | 201858501 U | 6/2011 |
| CN | 202351584 U | 7/2012 |

\* cited by examiner

BACK FRAME AND BACKLIGHT SYSTEM OF FLAT PANEL DISPLAY DEVICE

BACKGROUND OF THE INVENTION

1. Field of the Invention

The present invention relates to the field of displaying techniques, and in particular to a back frame and a backlight system of a flat panel display device.

2. The Related Arts

The state-of-the-art liquid crystal display device comprises a front bezel, a panel, and a backlight module, of which the backlight module comprises a back frame, a reflector plate, a light guide, and a lighting assembly.

Currently, a variety of display panels of different sizes are available in the market to meet different needs of general consumers. For example, in the field of television set, the sizes of liquid crystal panels include 31.5, 42, 46, 48, and 55 inches. Different back frame molds are provided for liquid crystal planes of different sizes.

Referring to FIG. 1, FIG. 1 is a schematic view showing a conventional back frame of liquid crystal display device. As shown in FIG. 1, the conventional back frame 10 is a unitary back frame, and it is often that a unitary back frame 10 is made with metal stamping or plastic injection molding. The unitary back frame 10 consumes much material and has a high material cost. Further, a large-sized back frame 10 requires large-sized stamping equipment, and the size of mold corresponding to such a back frame 10 is large and the structure complicated, making the expenditure of the back frame mold high. As a consequence, the conventional back frame is of a high cost.

SUMMARY OF THE INVENTION

The technical issue to be addressed by the present invention is to provide a back frame and a backlight system of a flat panel display device, which reduces material cost and mold cost.

To address the above technical issue, the present invention adopts a technical solution that provides a back frame of flat panel display device, which comprises at least two assembling pieces. The at least two assembling pieces are joined to form the back frame. The back frame further comprises a bracing piece that is fixed to the assembling pieces, wherein the assembling pieces are mountable to at least two different positions of the bracing piece in a lengthwise direction of the bracing piece and the bracing piece is mountable to at least two different positions of the assembling pieces in a lengthwise direction of the assembling piece.

According to a preferred embodiment of the present invention, the bracing piece forms at least two first through holes that are spaced in the lengthwise direction of the bracing piece or at least a first elongate through hole in the lengthwise direction of the bracing piece, the back frame further comprising a fastener for fixing the bracing piece and the assembling pieces, the fastener being positionable in any one of the at least two first through holes or at different positions within the first elongate through hole.

According to a preferred embodiment of the present invention, the assembling pieces form at least two second through holes that are spaced in the lengthwise direction of the assembling pieces or at least a second elongate through hole in the lengthwise direction of the assembling pieces, the fastener being positionable in any one of the at least two second through holes or at different positions within the second elongate through hole.

According to a preferred embodiment of the present invention, the bracing piece comprises at least two bracing members, the at least two bracing members being joined to form the bracing piece, wherein at least one of the bracing members is mountable to at least two different positions of another bracing member in the lengthwise direction of the bracing piece.

According to a preferred embodiment of the present invention, said another bracing member forms at least two through holes that are spaced in the lengthwise direction of the bracing piece, the bracing piece further comprising a fastener, the fastener being positionable in any one of the at least two through holes and fixing said another bracing member to said at least one of the bracing members.

According to a preferred embodiment of the present invention, said another bracing members forms an elongate through hole in the lengthwise direction of the bracing piece, the bracing piece further comprising a fastener, the fastener being positionable at different positions within the elongate through hole and fixing said another bracing member to said at least one of the bracing members.

According to a preferred embodiment of the present invention, the back frame comprises at least two primary assembling pieces, the at least two primary assembling pieces being joined to form a main frame structure of the back frame, the at least two primary assembling pieces comprising a first primary assembling piece and a second primary assembling piece, wherein the first primary assembling piece has an end forming at least two joint sections that are arranged to space from each other in a lengthwise direction of the first primary assembling piece, each of the joint sections having a structure mating an end of the second primary assembling piece, the first primary assembling piece using one of the joint sections to join the corresponding end of the second primary assembling piece.

According to a preferred embodiment of the present invention, the joint sections comprise recesses formed in a surface of the first primary assembling piece and having a shape corresponding to the end of the second primary assembling piece for receiving the end of the second primary assembling piece.

According to a preferred embodiment of the present invention, the joint sections comprise recesses formed in a surface of the first primary assembling piece, the second primary assembling piece having a surface forming protrusions at corresponding positions, the protrusions being receivable in the recesses to join the first primary assembling piece and the second primary assembling piece to each other.

To address the above technical issue, the present invention adopts a technical solution that provides a backlight system. The backlight system comprises a light source, a light homogenization mechanism, and a back frame; and the back frame carries the light source and the light homogenization mechanism. The back frame is a back frame of the back frame described in the above embodiments.

The efficacy of the present invention is that to be distinguished from the state of the art, the present invention provides a back frame and a backlight system that use assembling pieces that are joined to form a back frame so that a mold for the back frame is of a simple structure, the cost of back frame mold is reduced, the material used for back frame is saved, and the manufacturing cost of flat panel display device is lowered down. Further, by making the mounting position of a bracing piece to an assembling piece adjustable in a two-dimensional manner, a single bracing piece may meet different needs for mounting so as to further reduce the manufacturing cost of the flat panel display device.

DETAILED DESCRIPTION OF THE PREFERRED EMBODIMENTS

Figure 1:
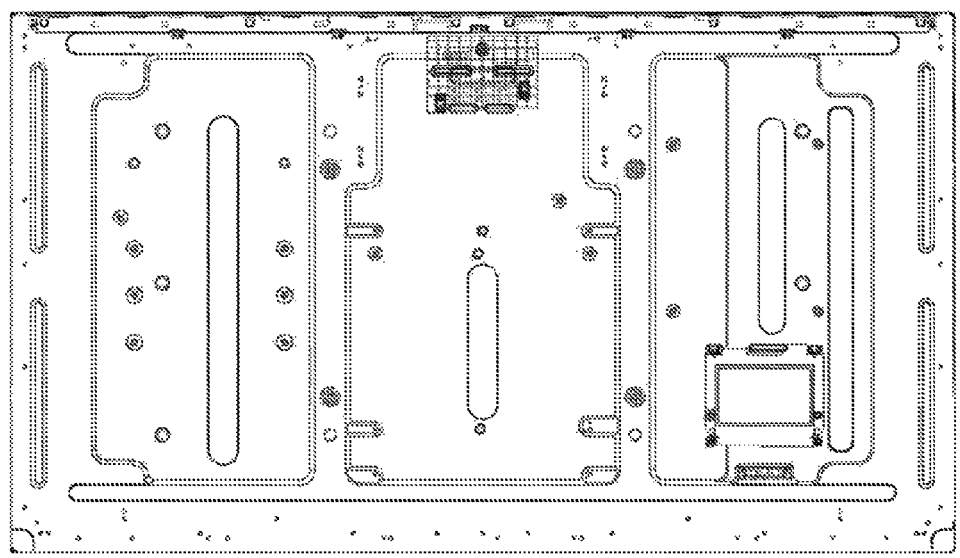
FIG. 1 is a schematic view showing a conventional back frame of liquid crystal display device.
Figure 2:
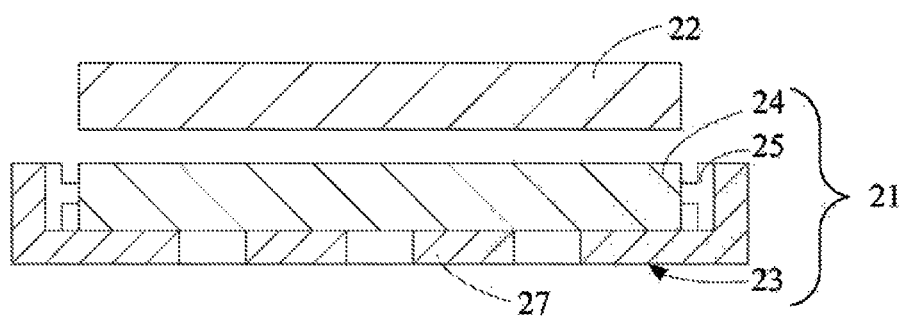
FIG. 2 is a schematic view showing a flat panel display device according to a first embodiment of the present invention.
Figure 3:
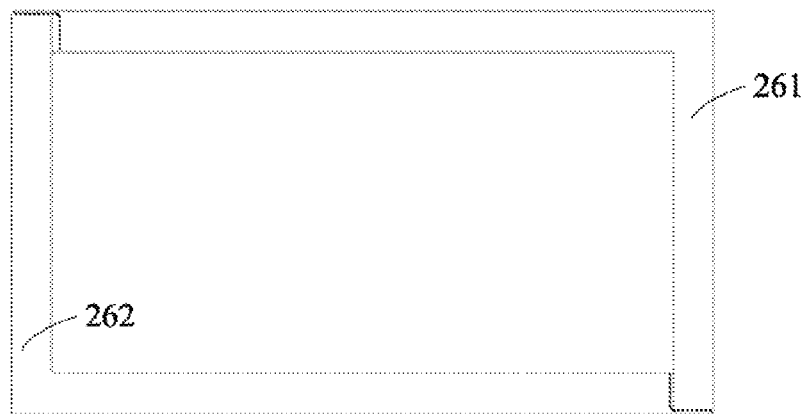
FIG. 3 is a schematic view showing a back frame of a flat panel display device according to a second embodiment of the present invention.

Referring to FIGS. 2-3, FIG. 2 is a schematic view showing a flat panel display device according to a first embodiment of the present invention and FIG. 3 is a schematic view showing a first embodiment of a back frame of a flat panel display device according to a second embodiment of the present invention. As shown in FIG. 2, the flat panel display device 20 according to the instant embodiment comprises: a backlight system 21 and a display panel 22. The backlight system 21 is arranged on a back side of the display panel 22 and supplies light to the display panel 22.

In the instant embodiment, the backlight system 21 comprises a light source 25, a light homogenization mechanism 24, and a back frame 23. The back frame 23 carries the light source 25 and the light homogenization mechanism 24. When the backlight system 21 is an edge lighting type, the light homogenization mechanism 24 is a light guide; and when the backlight system 21 is a direct type, the light homogenization mechanism 24 is a diffuser plate. The back frame 23 comprises at least a first primary assembling piece and a second primary assembling piece, and the two of at least a first and second primary assembling pieces constitute a main frame structure 27 of the back frame 23.

Referring also to FIG. 3, the back frame 23 of the first embodiment comprises a first primary assembling piece 261 and a second primary assembling piece 262. The first primary assembling piece 261 has an end joined to an end of the second primary assembling piece 262, and the first primary assembling piece 261 has another end joined to another end of the second primary assembling piece 262 in order to form the main frame structure 27 of the back frame 23. The first primary assembling piece 261 and the second primary assembling piece 262 are both aluminum pieces or galvanized steel pieces. In the instant embodiment, the first primary assembling piece 261 and the second primary assembling piece 262 are L-shaped.

Figure 4:
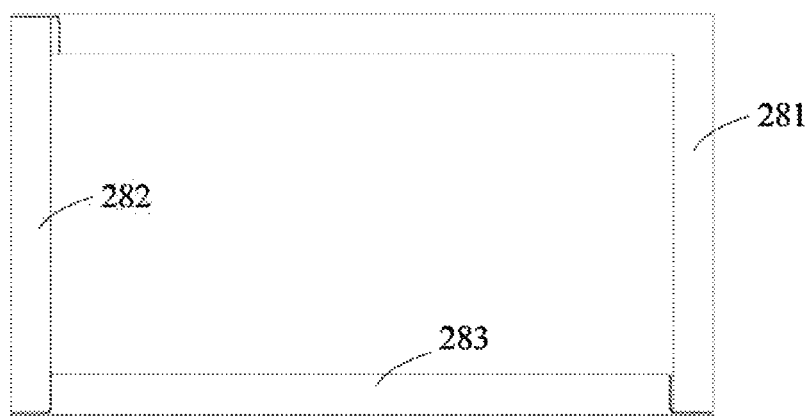
FIG. 4 is a schematic view showing a back frame of a flat panel display device according to a third embodiment of the present invention.

Referring also to FIG. 4, the back frame 23 of a second embodiment comprises a first primary assembling piece 281, a second primary assembling piece 282, and a third primary assembling piece 283. The three primary assembling pieces 281, 282, and 283 are assembled and joined to form a main frame structure 27 of the back frame 23. The three primary assembling pieces 281, 282, and 283 are all aluminum pieces or galvanized steel pieces. In the instant embodiment, the first primary assembling piece 281 is L-shaped, and the second and third primary assembling pieces 282, 283 are straight linear.

Further, the back frame 23 further comprises secondary assembling pieces arranged inside and joined to the main frame structure 27.

A detailed description will be given to the back frame 23 of the flat panel display device 20 according to the present invention, which comprises four primary assembling pieces and two secondary assembling pieces.

Figure 5:
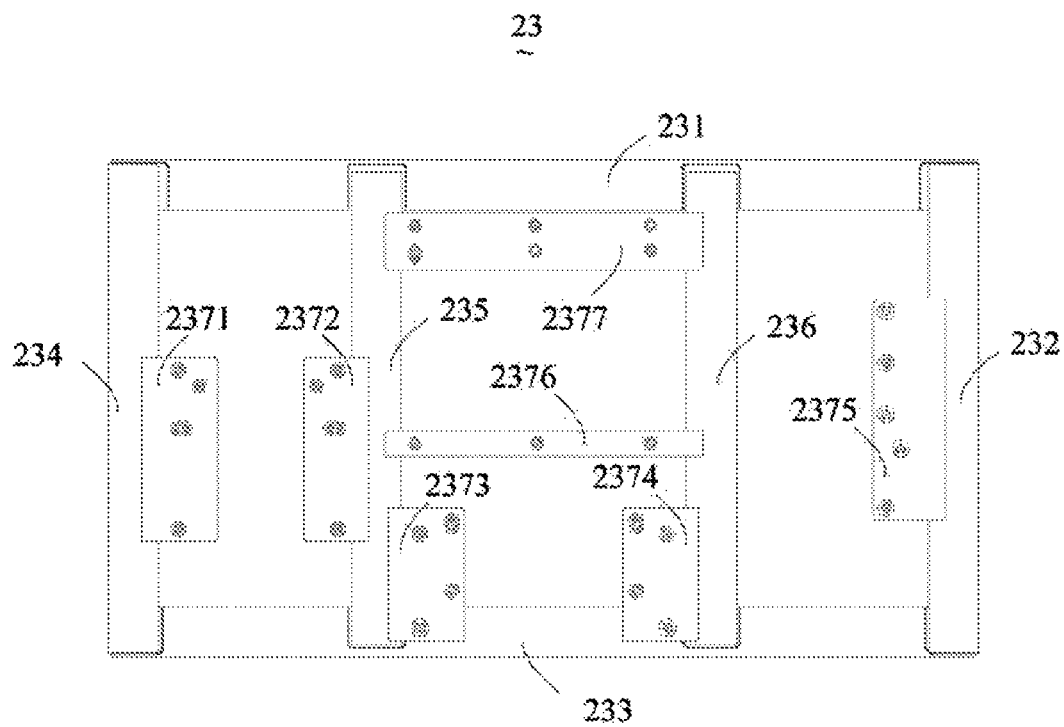
FIG. 5 is a schematic view showing a back frame of a flat panel display device according to a fourth embodiment of the present invention.

Referring to FIG. 5, FIG. 5 is a schematic view showing a back frame of flat panel display device according to a fourth embodiment of the present invention. As shown in FIG. 5, in the instant embodiment, a back frame 23 comprises: a first primary assembling piece 231, a second primary assembling piece 232, a third primary assembling piece 233, a fourth primary assembling piece 234, a first secondary assembling piece 235, a second secondary assembling piece 236, and bracing pieces 2371, 2372, 2373, 2374, 2375, 2376, and 2377. The first primary assembling piece 231, the second primary assembling piece 232, the third primary assembling piece 233, and the fourth primary assembling piece 234 are successively joined to each other in an end-to-end manner to constitute a rectangular main frame structure 27 of the back frame 23. The first secondary assembling piece 235 and the second secondary assembling piece 236, serving as ancillary assembling pieces, are arranged in the main frame structure 27 and joined to the main frame structure 27.

Specifically, an end of the first primary assembling piece 231 is joined to an end of the second primary assembling piece 232, another end of the second primary assembling piece 232 is joined to an end of the third primary assembling piece 233, another end of the third primary assembling piece 233 is joined to an end of the fourth primary assembling piece 234, and another end of the fourth primary assembling piece 234 is joined to another end of the first primary assembling piece 231 in order to form the rectangular main frame structure 27. The first primary assembling piece 231, the second primary assembling piece 232, the third primary assembling piece 233, and the fourth primary assembling piece 234 are all aluminum pieces or galvanized steel pieces. In the instant embodiment, the first primary assembling piece 231, the second primary assembling piece 232, the third primary assembling piece 233, and the fourth primary assembling piece 234 are straight linear, yet in other embodiments, it is apparent to those skilled in the art to make all the first primary assembling piece 231, the second primary assembling piece 232, the third primary assembling piece 233, and the fourth primary assembling piece 234 L-shaped, or some being straight linear and the remaining being L-shaped. For example, in FIG. 3, the first primary assembling piece 261 and the second primary assembling piece 262 are both L-shaped; in FIG. 4, the first primary assembling piece 281 is L-shaped, while the second and third primary assembling pieces 282 and 283 are straight linear.

Figure 6:
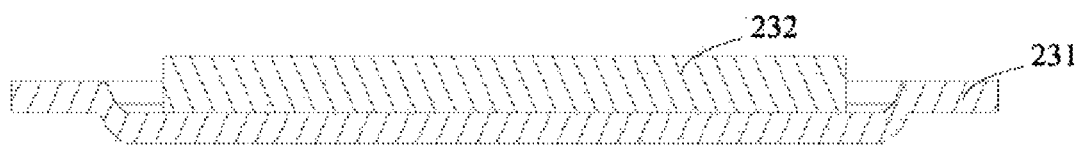
FIG. 6 is a schematic view showing a joining structure of a flat panel display device according to a fifth embodiment of the present invention.

In the instant embodiment, the back frame 23 of the flat panel display device 20 is formed by joining connection. As shown in FIG. 6, an illustrative example is given for the connection of an end of the first primary assembling piece 231 to an end of the second primary assembling piece 232, wherein the end of the second primary assembling piece 232 is joined to the end of the first primary assembling piece 231 by means of for example screwing, fastening, or welding, to have the end of the second primary assembling piece 232 connected to the end of the first primary assembling piece 231.

Figure 7:
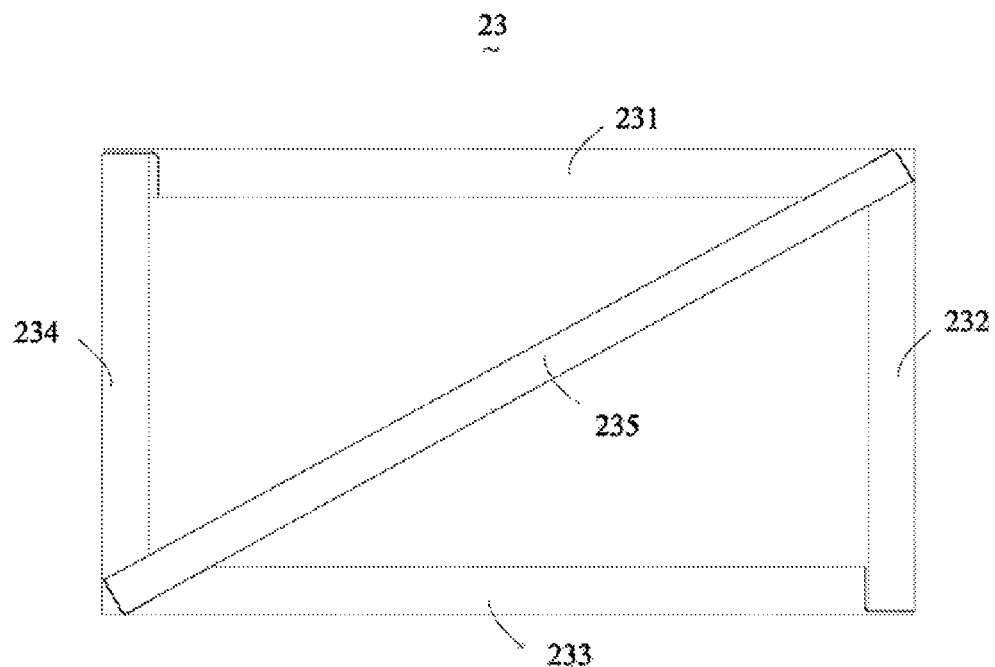
FIG. 7 is a schematic view showing a diagonally-arranged first secondary assembling piece mounted to a main frame structure of a flat panel display device according to a sixth embodiment of the present invention.
Figure 8:
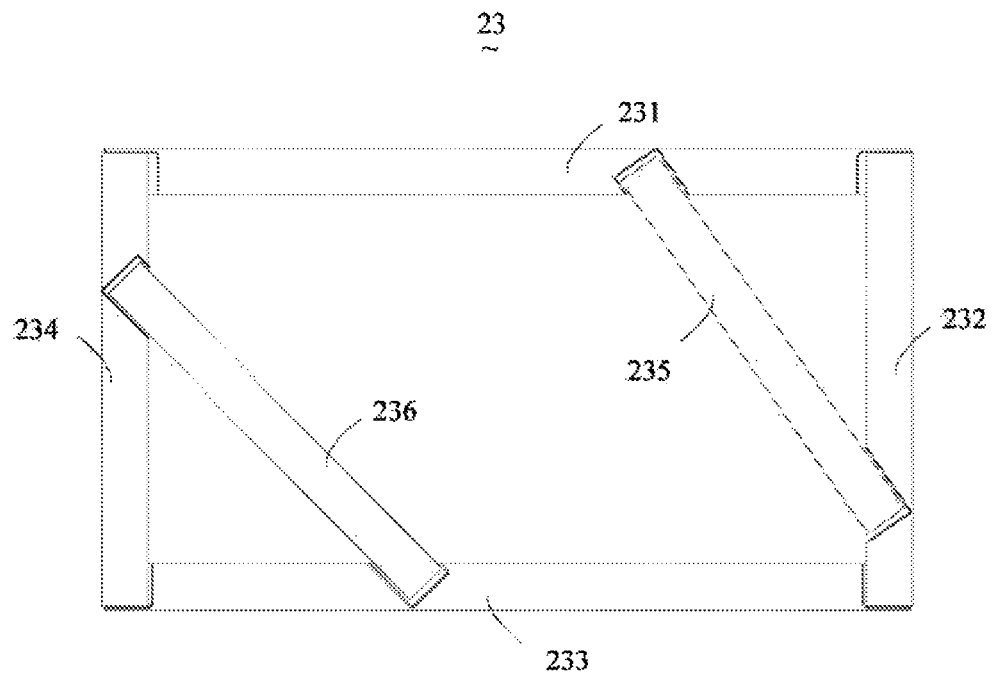
FIG. 8 is a schematic view showing a first secondary assembling piece and a second secondary assembling piece mounted to a main frame structure of a flat panel display device according to a seventh embodiment of the present invention.

In the instant embodiment, the first secondary assembling piece 235 and the second secondary assembling piece 236 are arranged in the main frame structure 27 of the back frame 23. An end of the first secondary assembling piece 235 is joined to the first primary assembling piece 231 and another end of the first secondary assembling piece 235 is joined to the third primary assembling piece 233; and an end of the second secondary assembling piece 236 is joined to the first primary assembling piece 231 and another end of the second secondary assembling piece 236 is joined to the third primary assembling piece 233. Further, the second primary assembling piece 232, the fourth primary assembling piece 234, the first secondary assembling piece 235, and the second secondary assembling piece 236 are arranged parallel to each other. In other embodiments, those skilled in the art may arrange at least one secondary assembling piece in the main frame structure 27. For example, only the first secondary assembling piece 235 is arranged in the main frame structure 27. Further, the two ends of the first secondary assembling piece 235 can be selectively joined to at least two of the primary assembling pieces of the first primary assembling piece 231, the second primary assembling piece 232, the third primary assembling piece 233, and the fourth primary assembling piece 234. For example, the first secondary assembling piece 235 is set diagonally in the main frame structure 27, as shown in FIG. 7. Similarly, the two ends of the second secondary assembling piece 236 can be selectively joined to at least two of the primary assembling pieces of the first primary assembling piece 231, the second primary assembling piece 232, the third primary assembling piece 233, and the fourth primary assembling piece 234. For example, the two ends of the first secondary assembling piece 235 are respectively joined to the first primary assembling piece 231 and the second primary assembling piece 232 that are adjacent to each other and the two ends of the second secondary assembling piece 236 are respectively joined the third primary assembling piece 233 and the fourth primary assembling piece 234 that are adjacent to each other, as shown in FIG. 8.

In the instant embodiment, the back frame 23 comprises seven bracing pieces 2371, 2372, 2373, 2374, 2375, 2376, and 2377. The bracing piece 2371 is fixed to the fourth primary assembling piece 234; the bracing pieces 2372, 2373 are both fixed to the first secondary assembling piece 235; the bracing piece 2374 is fixed to the second secondary assembling piece 236; the bracing piece 2375 is fixed to the second primary assembling piece 232; and the bracing pieces 2376, 2377 are each fixed, at two ends thereof, to the first secondary assembling piece 235 and the second secondary assembling piece 236. In practice, the bracing pieces can be fixed to one or more of the first primary assembling piece 231, the second primary assembling piece 232, the third primary assembling piece 233, the fourth primary assembling piece 234, the first secondary assembling piece 235, and the second secondary assembling piece 236. In other embodiments, those skilled in the art may mount bracing pieces of any other numbers to the back frame 23, such as one or more bracing pieces. Further, the bracing pieces can be releasably fixed to one or more of the first primary assembling piece 231, the second primary assembling piece 232, the third primary assembling piece 233, the fourth primary assembling piece 234, the first secondary assembling piece 235, and the second secondary assembling piece 236.

The bracing pieces 2371, 2372, 2373, 2374, 2375, 2376, and 2377 may be provided with bumps (not labeled) so that the back frame 23 may fix components, such as circuit boards, with such bumps.

Molds for making the back frame 23 will be described. In the instant embodiment, the first primary assembling piece 231 and the third primary assembling piece 233 are of the same size and shape so that they can be made by stamping with the same mold. The second primary assembling piece 232, the fourth primary assembling piece 234, the first secondary assembling piece 235, and the second secondary assembling piece 236 are of the same size and shape so that they can be made by stamping with the same mold, making it possible to share the mold. Thus, the back frame 23 of the present invention can be made by stamping with only two small-sized molds, and compared to the conventional back frame 10 that requires a large-sized mold, the molds for making the back frame 23 of the present invention are simple in structure and small in size and thus the cost of mold for the back frame 23 can be lowered. Further, compared to the whole back frame structure of the conventional back frame 10, the back frame 23 of the present invention can significantly save material used and thus reduce the manufacturing cost of the flat panel display device 20.

Figure 9:
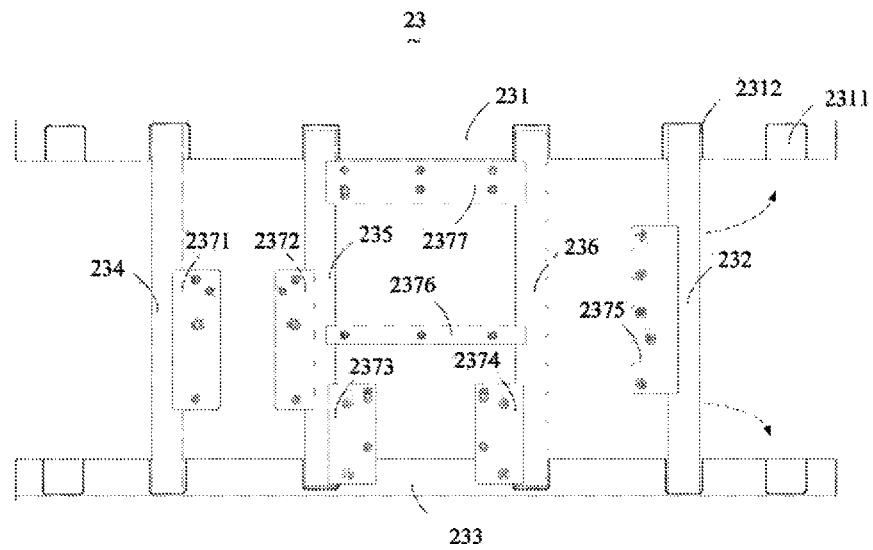
FIG. 9 is a schematic view showing joint sections of a back frame of a flat panel display device according to an eighth embodiment of the present invention.

Referring to FIG. 9, FIG. 9 is a schematic view showing joint sections of a back frame of a flat panel display device according to an eighth embodiment of the present invention. As shown in FIG. 9, in the instant embodiment, an end of the first primary assembling piece is provided with two joint sections, and the joint sections have a structure mating an end of the second primary assembling piece so that the first primary assembling piece can be joined to a corresponding end of the second primary assembling piece.

Figure 10:
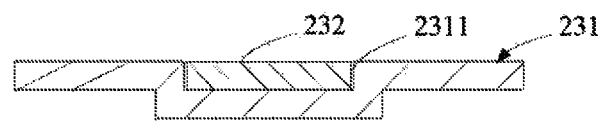
FIG. 10 is a cross-sectional view showing a first example of joint section of FIG. 9.

Specifically, the first primary assembling piece 231 has an end forming joint sections 2311, 2312, and the joint sections 2311, 2312 are arranged in a spaced manner in a lengthwise direction of the first primary assembling piece 231. The joint sections 2311, 2312 are formed by forming recesses having a shape mating an end of the second primary assembling piece 232 in the first primary assembling piece 231 in order to receive the end of the second primary assembling piece 232 therein. As shown in FIG. 10, the joint sections 2311, 2312 are recesses that do not extend through opposite surfaces of the end of the first primary assembling piece 231 and the recesses are of a rectangular shape with the second primary assembling piece 232 being straight linear.

Figure 11:
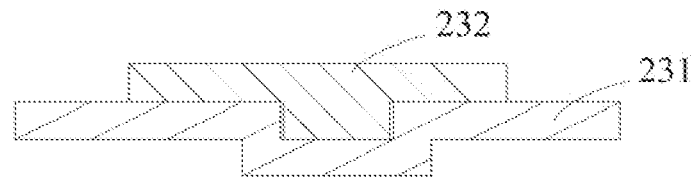
FIG. 11 is a schematic view showing a joining structure of a joint section of a back frame of a flat panel display device according to a ninth embodiment of the present invention.

To assemble a large-sized back frame 23, the joint section 2311 that is close to the very end of the first primary assembling piece 231 is first taken and a second primary assembling piece 232 having a corresponding width is selected. Afterwards, an end of the second primary assembling piece 232 is positioned in the recess of the joint section 2311. And then, means, such as screwing, fastening, or welding, is applied to join and fix the end of the second primary assembling piece 232 to the joint section 2311. To assemble a small-sized back frame 23, the joint section 2312 that is distant from the very end of the first primary assembling piece 231 is first chosen and a second primary assembling piece 232 having a corresponding width is selected. Afterwards, an end of the second primary assembling piece 232 is positioned in the recess of the joint section 2312. And then, means, such as screwing, fastening, or welding, is applied to join and fix the end of the second primary assembling piece 232 to the joint section 2312. Specifically, for example the second primary assembling piece 232 forms a protrusion at a corresponding location on a surface thereof, and the protrusion of the second primary assembling piece 232 is embedded in the recess the first primary assembling piece 231 at a corresponding location in order to join the first primary assembling piece 231 and the second primary assembling piece 232, as shown in FIG. 11. Further, the second primary assembling piece 232 may form, on one end thereof, at least two protrusions that are spaced in the lengthwise direction of the second primary assembling piece 232, such as two, three, or four protrusions.

Figure 12:
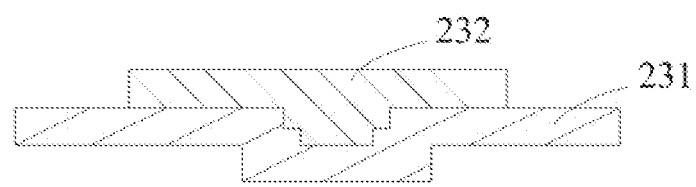
FIG. 12 is a schematic view showing a joining structure of a joint section of a back frame of a flat panel display device according to a tenth embodiment of the present invention.
Figure 13:
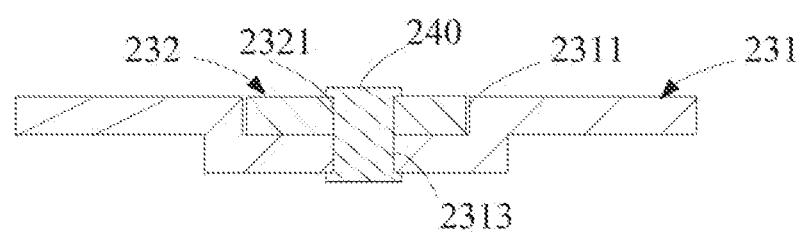
FIG. 13 is a schematic view showing a joining structure of a joint section of a back frame of a flat panel display device according to an eleventh embodiment of the present invention.

Furthermore, the recess of the first primary assembling piece 231 can be a recess of a multi-stepped configuration and the second primary assembling piece 232 forms, at a corresponding location, a protrusion having a multi-stepped configuration corresponding to the recess, as shown in FIG. 12. Further, as shown in FIG. 13, taking the joint section 2311 as an example, the recess of the first primary assembling piece 231 forms, in a bottom thereof, a first through hole 2313, and the second primary assembling piece 232 forms, at a location corresponding to the joint section 2311, a second through hole 2321. The back frame 23 further comprises a fastener 240. The fastener 240 extends through the first through hole 2313 and the second through hole 2321 to joint the first primary assembling piece 231 and the second primary assembling piece 232 to each other.

Figure 14:
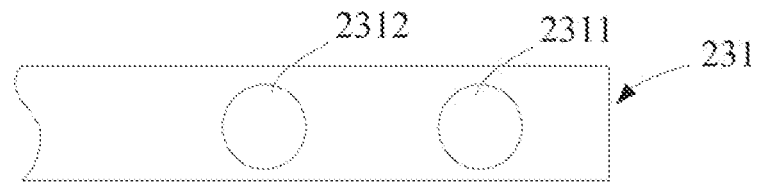
FIG. 14 is a schematic view showing a joint section of a back frame of a flat panel display device according to a twelfth embodiment of the present invention.

As shown in FIG. 14, in another embodiment of the back frame of flat panel display device according to the present invention, the recesses of the joint sections 2311, 2312 of the first primary assembling piece 231 are of a circular shape. Yet, in other embodiments, those skilled in the art may arrange the shape of the recesses to be other polygonal configurations, such as triangle.

Figure 15:
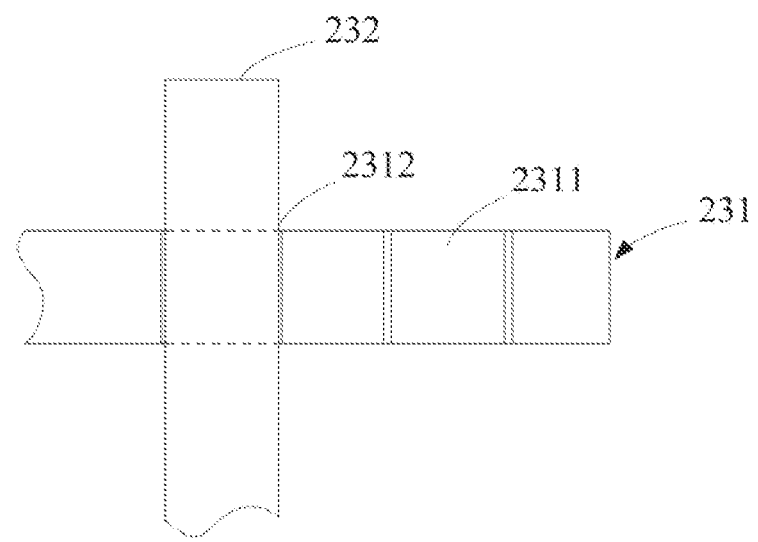
FIG. 15 is a schematic view showing a joint section of a back frame of a flat panel display device according to a thirteenth embodiment of the present invention.

As shown in FIG. 15, in another embodiment of the back frame of flat panel display device according to the present invention, the joint sections 2311, 2312 are recesses that do not extend through opposite surfaces of the first primary assembling piece 231, whereby an end of the second primary assembling piece 232 is movable within the joint sections 2311, 2312. For example, after the end of the second primary assembling piece 232 is set extending beyond and joined and fixed to the joint section 2312, the portion of extension is then trimmed off so that the length of the second primary assembling piece 232 that serves as a primary assembling piece of the back frame can be adjusted.

In a practical application, the other end of the first primary assembling piece 231 and both ends of the third primary assembling piece 233 are all provided with two joint sections having a structure identical to that of the joint sections 2311, 2312. The ends of the second primary assembling piece 232 and the ends of the fourth primary assembling piece 234 may be subjected to specific designs or no design at all according to the application. For example:

(1) In a first situation, as shown in FIG. 10, the two ends of the second primary assembling piece 232 and the two ends of the fourth primary assembling piece 234 are of no specific design. In other words, the ends are of the same structure as the remaining portions. Under this condition, in making a join with a selected joint section 2311 (2312) at one end of the first primary assembling piece 231 (the same applicable to the other end), if an attempt is made to change the width of the back frame 23, then the length of the corresponding second primary assembling piece 232 and fourth primary assembling piece 234 must be selected accordingly. Namely, if the joint section 2311 that is close to the very end of the first primary assembling piece 231 is selected for joining, then no trimming is applied to the second primary assembling piece 232 and the fourth primary assembling piece 234 or the portion that is trimmed off is short; if the joint section 2312 that is distant from the very end of the first primary assembling piece 231 is selected for joining, then the second primary assembling piece 232 and the fourth primary assembling piece 234 are trimmed and the trimmed portion being long or short is according to the distance that the joint section is from the very end of the first primary assembling piece 231 being great or small; and (2) In a second situation, it is similar to the first situation, but as shown in FIG. 11, the second primary assembling piece 232 and the fourth primary assembling piece 234 use different protrusions to respectively mate the first primary assembling piece 231 and the third primary assembling piece 233 in order to realize change of width of the back frame 23; similarly, if a joint section 2312 other than the first joint section 2311 that is close to the very end of the first primary assembling piece 231 is selected for joining, then before or after joining, excessive portions of the second primary assembling piece 232 and the fourth primary assembling piece 234 may be trimmed off.

This also applicable to a main frame structure 27 of the back frame 23 that is formed by joining two L-shaped primary assembling pieces.

In summary, the present invention provides a back frame 23 having a first primary assembling piece that is provided with at least two joint sections. The number of the joint section can be selected according to the requirement of customers. In the instant embodiment, a description is given to an example comprising two joint sections 2311, 2312. Thus, to prepare the molds for making the back frame 23, only two sets of mold are needed, namely one mold for a first primary assembling piece and the other mold for a second primary assembling piece. The first primary assembling piece may be provided with a plurality of joint sections for joining operation in order to form various sizes for the back frame 23. To assemble the back frame 23, based on the desired size of the back frame 23, the corresponding one of the joint sections is selected. With the joint section, the second primary assembling piece is joined to the joint section of the first primary assembling piece and the other joint section of the first primary assembling piece that is located outward of the joining location of the second primary assembling piece is trimmed off to obtain a desired size of the back frame 23. Compared to the conventional technology that requires different back frame molds for making different sizes of back frame 10, the back frame of the flat panel display device 23 according to the present invention requires only a mold for the first primary assembling piece and a mold for the second primary assembling piece 28 so that mold sharing among various sizes of product can be realized and the molds used are of simple structures, allowing of reduction of expenditure of the molds for back frames.

The present invention also provides a mold for making a back frame of flat panel display device. The back frame mold is provided with a main pattern for forming a primary assembling piece of the back frame and the main pattern comprises a sub-pattern that forms at least two joint sections on an end of the primary assembling piece. The primary assembling piece comprises the previously discussed first primary assembling piece and second primary assembling piece, corresponding to the above mentioned main pattern; and the joint section comprises the previously discussed joint section of the first primary assembling piece, corresponding to the above mentioned sub-pattern. Repeated description is omitted herein.

Figure 16:
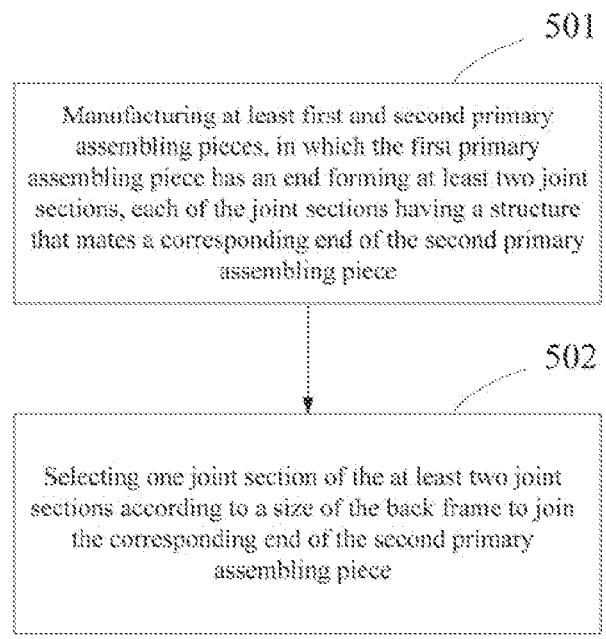
FIG. 16 is a flow chart showing a method for manufacturing a back frame of a flat panel display device according to a fourteenth embodiment of the present invention.

As shown in FIG. 16, the present invention also provides a method for making a back frame of flat panel display device. The method comprises the following steps:

Step 501: manufacturing at least first and second primary assembling pieces, in which the first primary assembling piece has an end forming at least two joint sections, each of the joint sections having a structure that mates a corresponding end of the second primary assembling piece; and Step 502: selecting one joint section of the at least two joint sections according to a size of the back frame to join the corresponding end of the second primary assembling piece.

In the instant embodiment, when other joint sections are present between the joining location of the second primary assembling piece and the end of the first primary assembling piece, before or after the step of selecting one joint section of the at least two joint sections according to a size of the back frame to join the corresponding end of the second primary assembling piece, the other joint sections of the first primary assembling piece that are located outward of the joining position of the second primary assembling piece are trimmed off. The first primary assembling piece comprises the previously discussed first primary assembling piece, and the second primary assembling piece comprises the previously discussed second primary assembling piece, and repeated description will be omitted herein.

Figure 17:
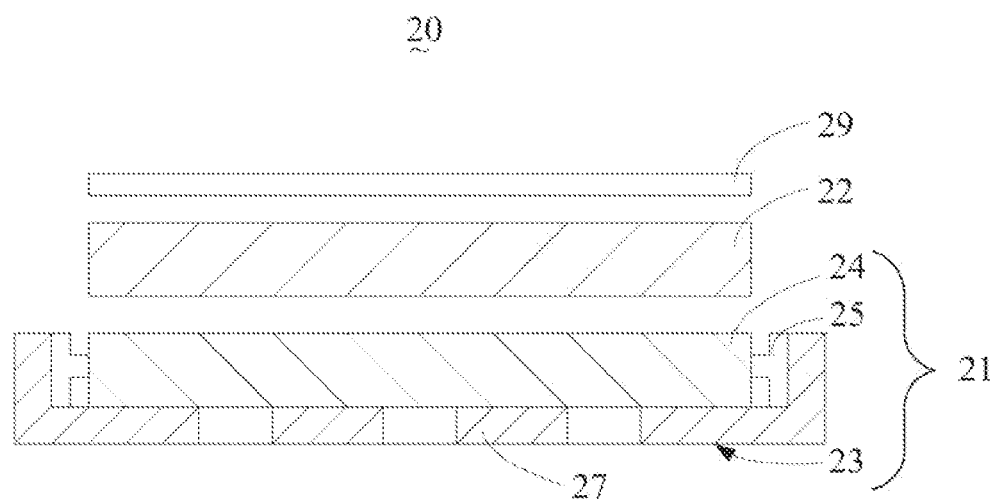
FIG. 17 is a schematic view showing a flat panel display device with a touch screen according to a fifteenth embodiment of the present invention.

As shown in FIG. 17, the flat panel display device 20 of the present invention further comprises a touch screen 29. The touch screen 29 is arranged on a light exit surface of the display panel 22 of the flat panel display device 20. The flat panel display device 20 comprises: the backlight system 21 and the above discussed display panel 22. The backlight system 21 is arranged at the back side of the display panel 22 and supplies light to the display panel 22.

The backlight system 21 comprises a light source 25, a light homogenization mechanism 24, and a back frame 23. The back frame 23 carries the light source 25 and the light homogenization mechanism 24. When the backlight system 21 is an edge lighting type, the light homogenization mechanism 24 is a light guide; and when the backlight system 21 is a direct type, the light homogenization mechanism 24 is a diffuser plate. The back frame 23 comprises at least a first primary assembling piece and a second primary assembling piece, and the at least one first and second primary assembling pieces constitute a main frame structure 27 of the back frame 23.

It is noted that the flat panel display device 20 of the present invention can be a liquid crystal display device or a liquid crystal television.

Figure 18:
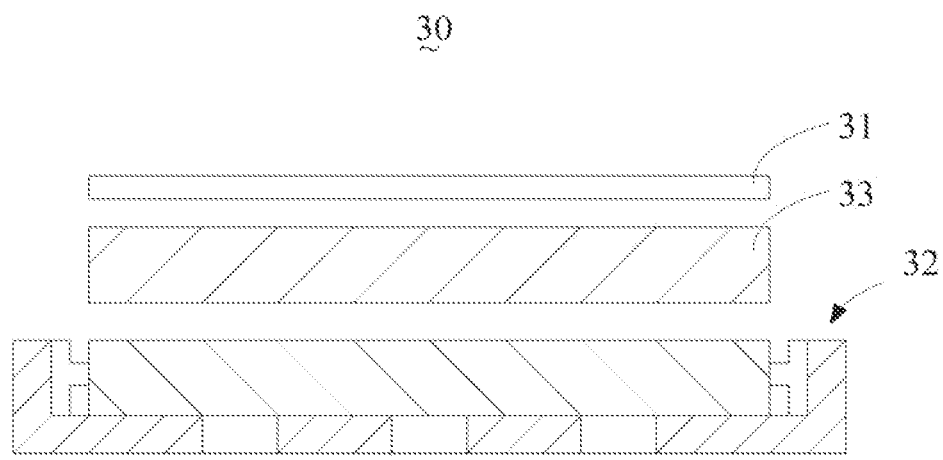
FIG. 18 is a schematic view showing a stereoscopic display device according to a sixteenth embodiment of the present invention.

The present invention also provides a stereoscopic display device 30, as shown in FIG. 18. The stereoscopic display device 30 comprises a liquid crystal lens grating 31, a backlight system 32, and a display panel 33. The liquid crystal lens grating 31 is arranged on a light exit surface of the display panel 33. The backlight system 32 can be a backlight system of one of the above discussed embodiments, such as the backlight system 32 comprising the back frame 23. The back frame 23 comprises at least first primary assembling piece and the second primary assembling piece. The at least first and second primary assembling pieces form a main frame structure of the back frame. Repeated description will be omitted herein.

Figure 19:
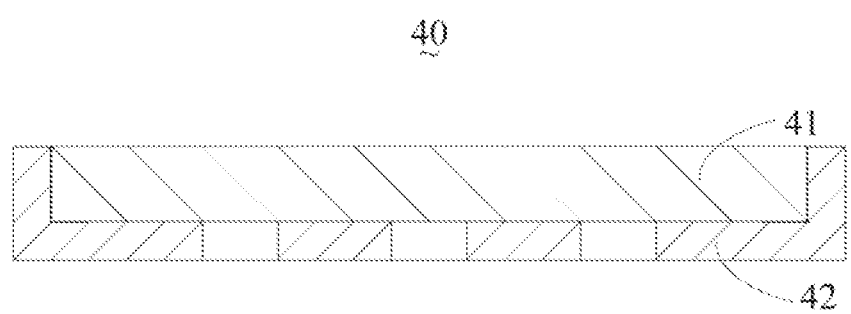
FIG. 19 is a schematic view showing a plasma display device according to a seventeenth embodiment of the present invention.

The present invention also provides a plasma display device 40, as shown in FIG. 19. The plasma display device 40 comprises a plasma display panel 41 and a back frame 42. The back frame 42 is arranged at a back side of the display panel 41. The back frame 42 can be the back frame of any of the previously discussed embodiments and repeated description will be omitted herein.

The present invention also provides a bracing piece that is applicable to the back frame of each of the above disclosed embodiments, wherein the bracing piece is fixed to the assembling pieces; the assembling pieces are mountable to at least two different positions of the bracing piece in a lengthwise direction of the bracing piece and the bracing piece is mountable to at least two different positions of the assembling pieces in a lengthwise direction of the assembling pieces, whereby the bracing piece is movable in both the lengthwise direction of the assembling pieces and the lengthwise direction of the bracing piece to make positions of bumps that are provided on the bracing piece for positioning purposes adjustable in a two-dimensional manner in order to meet the needs for different assembling requirements of the back frame.

Figure 20:
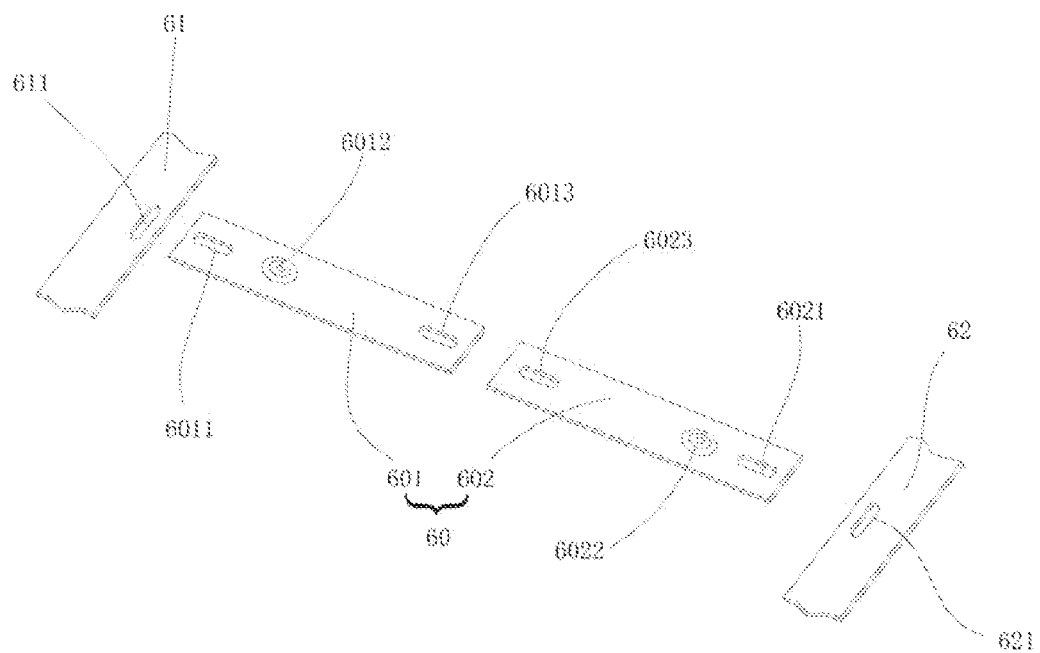
FIG. 20 is a schematic view showing a portion of a back frame of a flat panel display device according to an eighteenth embodiment of the present invention.

Specifically, as shown in FIG. 20, in the instant embodiment, the bracing piece 60 is formed by joining bracing members 601, 602. Two ends of the bracing piece 60 are respectively fixed to assembling pieces 61, 62. The assembling pieces 61, 62 are mountable to the bracing piece 60 in at least two different positions in the lengthwise direction of the bracing piece 60 and the bracing piece 60 is mountable to the assembling pieces 61, 62 in at least two different positions in the lengthwise direction of the assembling pieces 61, 62. The assembling pieces 61, 62 can be the primary assembling pieces or the secondary assembling pieces of each of the above embodiments. In other backup embodiments, the bracing piece 60 may has only one end fixed to the assembling piece, while the other end is arranged in a suspending form. The bracing piece 60 may also be of a unitary design.

Figure 21:
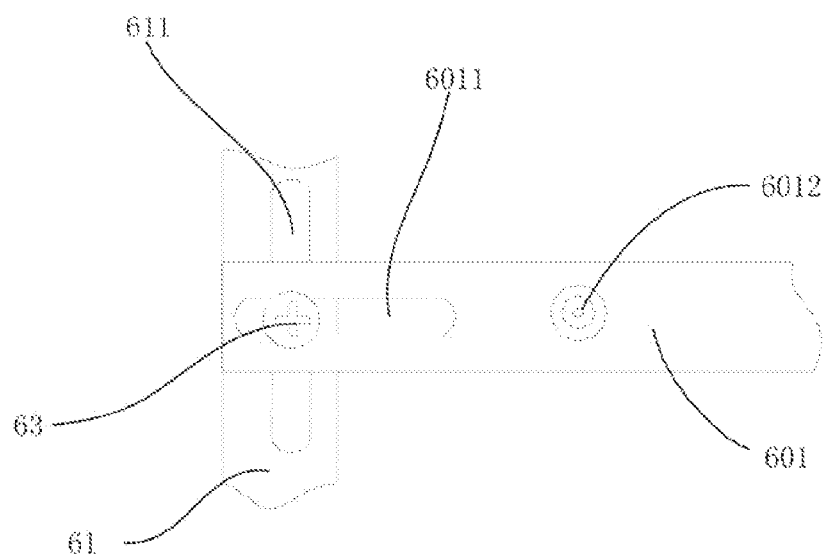
FIG. 21 is an enlarged view showing a mounting site of a bracing member of a back frame and an assembling piece shown in FIG. 20.
Figure 22:
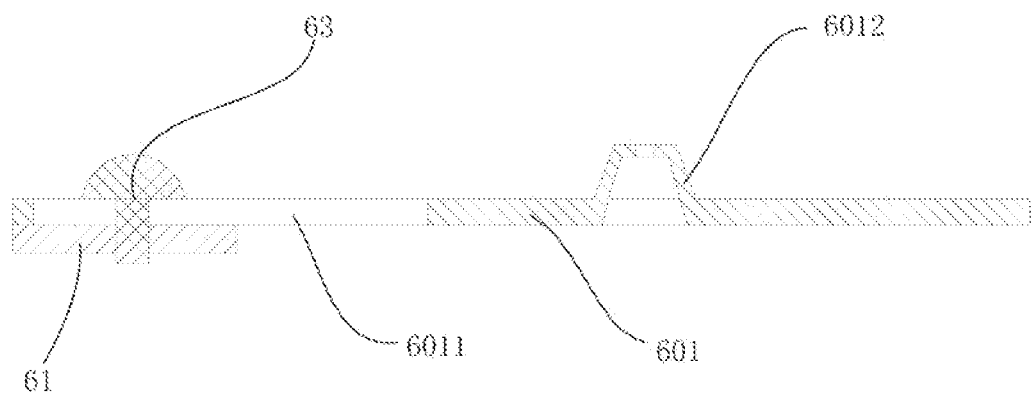
FIG. 22 is a cross-sectional view showing the mounting site of the bracing member of the back frame and the assembling piece shown in FIG. 20.

Further as shown in FIGS. 21-22, formed in an end of the bracing member 601 that is fixed to the assembling piece 61 is an elongate through hole 6011 that is arranged in the bracing member 601 in the lengthwise direction of the bracing piece 60. The assembling piece 61 forms an elongate through hole 611 in the lengthwise direction of the assembling piece 61. The bracing member 601 is fixed by a screw 63 to the assembling piece 61 of the back frame. The screw 63 is positionable in different locations within the elongate through hole 6011 and the elongate through hole 611. Thus, in assembling, the elongate through hole 6011 is put to overlap the elongate through hole 611 of the assembling piece 61 and according to the need for mounting, the position of the bracing member 601 on the assembling piece 61 is adjusted in the lengthwise direction of the bracing piece 60 and the position of the bracing member 601 on the assembling piece 61 is adjusted in the lengthwise direction of the assembling piece 61 so as to adjust the position of the bump 6012 of the bracing member 601 in two directions with respect to the assembling piece 61. After the bump 6012 of the bracing member 601 has been adjusted to a desired position, the screw 63 is set in a corresponding position within the elongate through hole 6011 and the elongate through hole 611 for screwing to thereby fix the bracing member 601 to the assembling piece 61.

Figure 23:
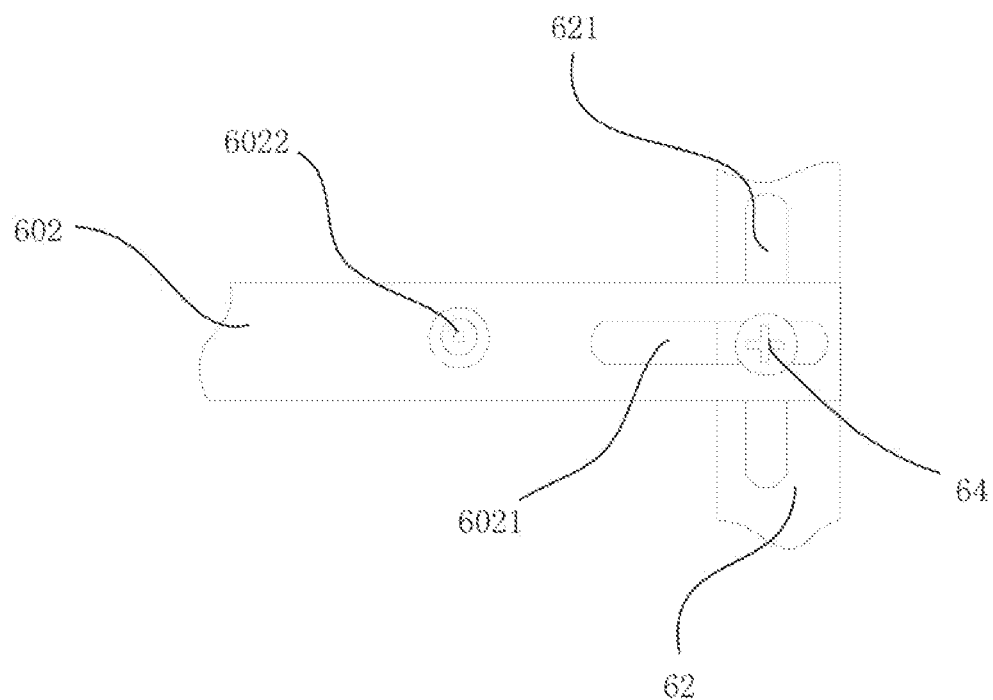
FIG. 23 is an enlarged view showing a mounting site of another bracing member of the back frame and another assembling piece shown in FIG. 20.
Figure 24:
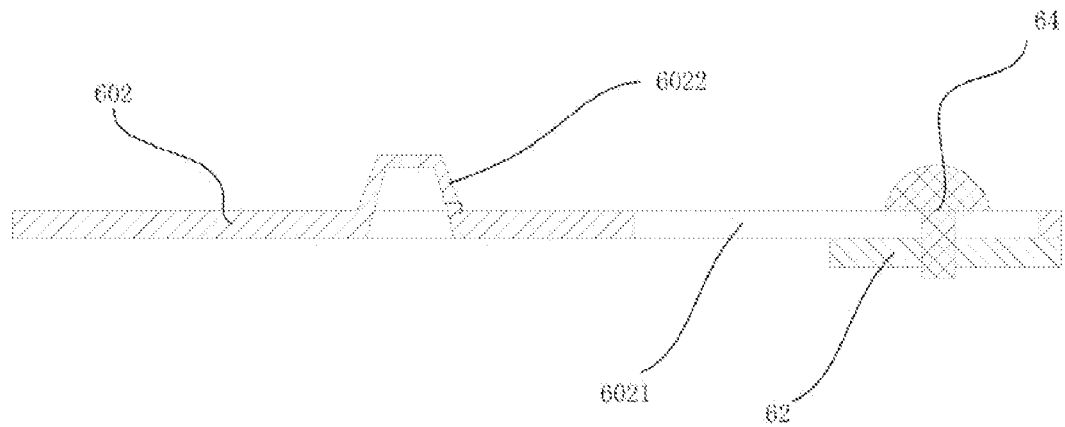
FIG. 24 is a cross-sectional view showing the mounting site of said another bracing member of the back frame and said another assembling piece shown in FIG. 20.

Similarly, further as shown in FIGS. 23-24, in an end of the bracing member 602 that is fixed to the assembling piece 62, an elongate through hole 6021 is formed in the lengthwise direction of the bracing piece 60, and an elongate through hole 621 is formed in the assembling piece 62 in a lengthwise direction thereof. A screw 64 is positionable in different positions within the elongate through hole 6021 and the elongate through hole 621 for screwing to thereby fix the bracing member 602 to the assembling piece 62, so as to realize position adjustment of a bump 6022 with respect to the assembling piece 62.

Figure 25:
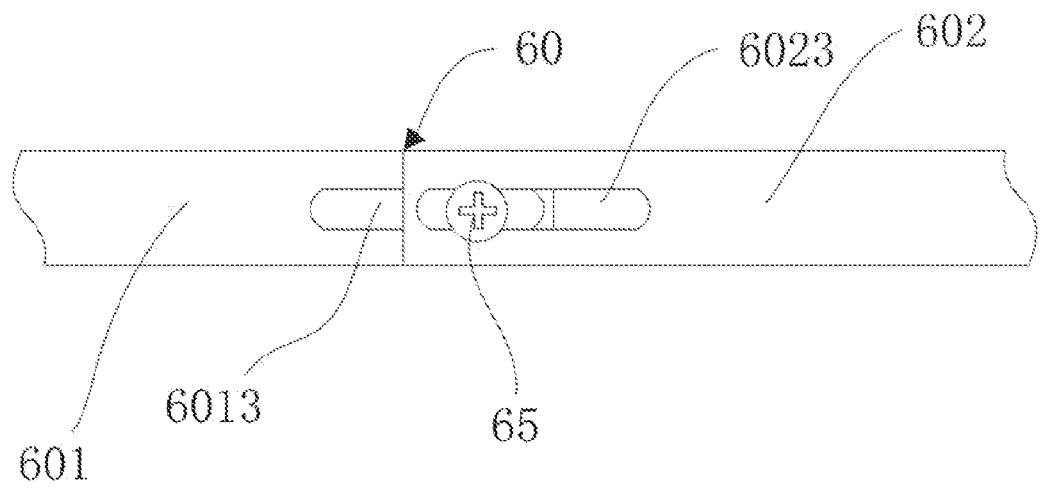
FIG. 25 is an enlarged view showing a mounting site of two bracing members of a back frame shown in FIG. 20.
Figure 26:
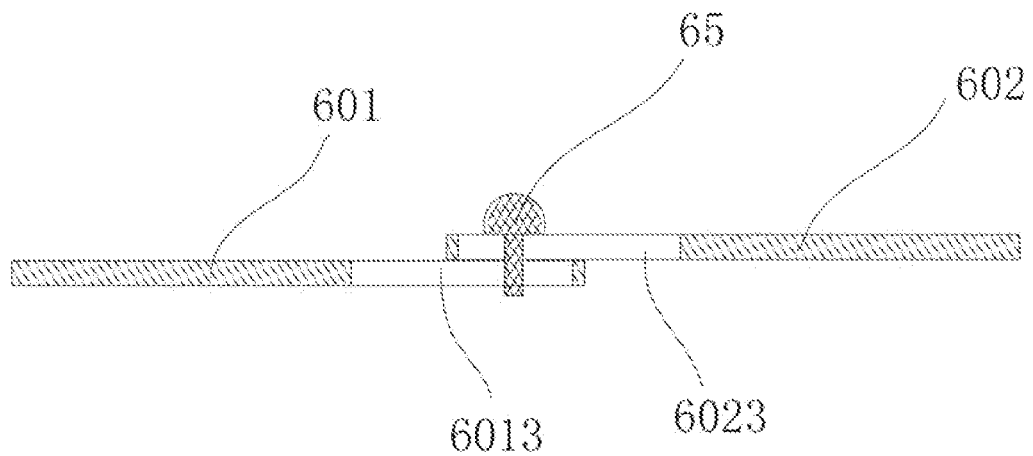
FIG. 26 is a cross-sectional vie showing the mounting site of the two bracing members of the back frame shown in FIG. 20.

Further as shown in FIGS. 25-26, in ends of the bracing member 601 and the bracing member 602 that are fixed to each other, an elongate through hole 6013 is formed in the bracing member 601 in the lengthwise direction of the bracing piece 60, and an the elongate through hole 6023 is formed in the bracing member 602 in the lengthwise direction of the bracing piece 60. The bracing member 601 is fixed by a screw 65 to the bracing member 602. The screw 65 can be set at different positions within the elongate through holes 6013, 6023. In assembling, the elongate through holes 6013, 6023 are set to overlap each other and the positions of the bracing members 601 and 602 in the lengthwise direction of the bracing piece 60 are adjusted according to the needs for mounting so as to adjust the positions of bumps 6012, 6022 with respect to the assembling pieces 61, 62 (see FIG. 20) and the length of the bracing piece 60. After the adjustment of position, the screw 65 is set to a corresponding position between the elongate through holes 6013 and 6023 and screwing is carried out to fix the bracing member 601 to the bracing member 602. In other backup embodiments, the screws 63, 64, 65 can be replaced by other fasteners, such as rivets and bolts.

Figure 27:
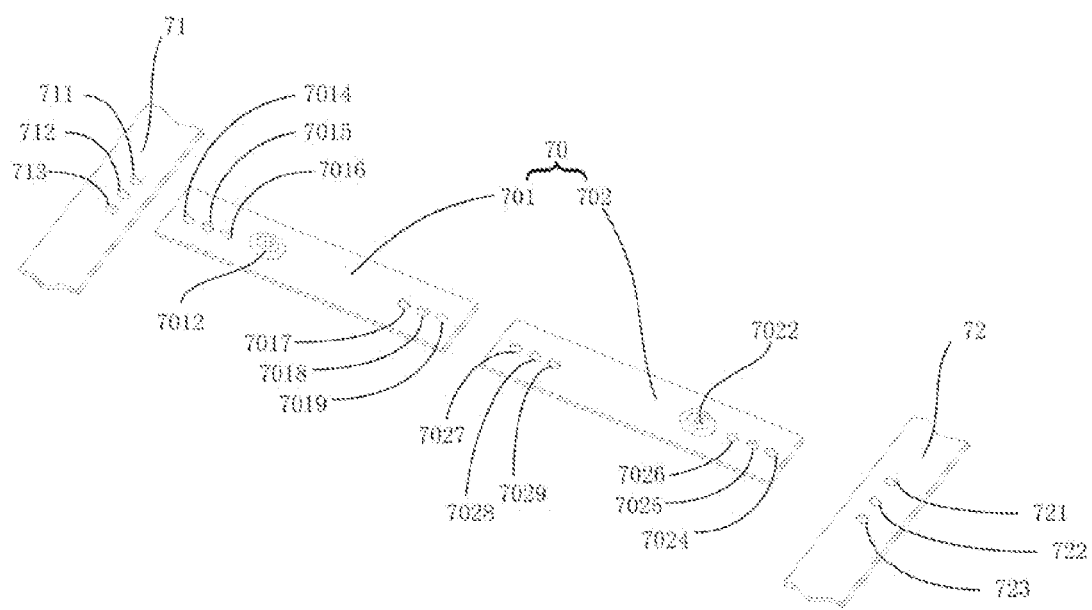
FIG. 27 is a schematic view showing a portion of a back frame of a flat panel display device according to a nineteenth embodiment of the present invention.

As shown in FIG. 27, in the instant embodiment, the bracing piece forms at least two through holes that are spaced in the lengthwise direction of the bracing piece to replace the elongate through hole formed in the bracing piece of the above embodiments, and at least two through holes that are spaced in the lengthwise direction of the assembling piece are formed in the assembling piece to replace the elongate through hole formed in the assembling piece of the above embodiments. Specifically, in the end of the bracing member 701 that is fixed to the assembling piece 71, a plurality of through holes 7014, 7015, 7016 is arranged in the bracing member 701 in the lengthwise direction of the bracing piece 70, and a plurality of through holes 711, 712, 713 is arranged in the assembling piece 71 in the lengthwise direction of the assembling piece 71. A screw (not shown) can be set in one of the through holes 7014, 7015, 7016 and also set in one of the through holes 711, 712, 713 of the assembling piece 71 for screwing so as to fix the bracing member 701 to the assembling piece 71, thereby realizing position adjustment of a bump 7012 with respect to the assembling piece 71.

Similarly, in an end of the bracing member 702 that is fixed to the assembling piece 72, a plurality of through holes 7024, 7025, 7026 is arranged in the bracing member 702 in the lengthwise direction of the bracing piece 70, and a plurality of through holes 721, 722, 723 is arranged in the assembling piece 72 in the lengthwise direction of the assembling piece 72. A screw (not shown) can be set in one of the through holes 7024, 7025, 7026 and also set in one of the through holes 721, 722, 723 of the assembling piece 72 for screwing so as to fix the bracing member 702 to the assembling piece 72, thereby realizing position adjustment of a bump 7022 with respect to the assembling piece 72.

Further, in ends of the bracing member 701 and the bracing member 702 that are fixed to each other, a plurality of through holes 7017, 7018, 7019 is arranged in the bracing member 701 in the lengthwise direction of the bracing piece 70 and a plurality of through holes 7027, 7028, 7029 is arranged in the bracing member 702 in the lengthwise direction of the bracing piece 70. A screw (not shown) can be set in any of the plurality of through holes 7017, 7018, 7019 and any one of the plurality of through holes 7027, 7028, 7029 for screwing. In assembling, the positions of the bracing members 701 and 702 in the lengthwise direction of the bracing piece 70 are adjusted according to the needs for mounting and corresponding ones of the through holes are set to overlap each other so as to adjust the positions of bumps 7012, 7022 with respect to the assembling pieces 71, 72 and the length of the bracing piece 70. After the position adjustment, a screw is set to the overlapped position of corresponding through holes to carry out screwing so as to fix the bracing member 701 to the bracing member 702. In the instant embodiment, the above described through holes are of a number of at least two.

In the above embodiments, the bracing piece is fixed by screws to the assembling pieces, but those having ordinary skills in the art may easily contemplate that fasteners, such as rivets, can be used for fixing. The present invention imposes no specific limitation in this respect.

With the above discussed manners, the present invention provides a back frame and a backlight system of a flat panel display device that use assembling pieces that are joined to form a back frame so that a mold for the back frame is of a simple structure, the cost of back frame mold is reduced, the material used for back frame is saved, and the manufacturing cost of flat panel display device is lowered down. Further, by making the mounting position of a bracing piece to an assembling piece adjustable in two dimensions, a single bracing piece may meet different needs for mounting so as to further reduce the manufacturing cost of the flat panel display device.

Embodiments of the present invention have been described, but are not intending to impose any undue constraint to the appended claims of the present invention. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A back frame of a flat panel display device, wherein the back frame comprises at least two assembling pieces, the at least two assembling pieces being joined to form the back frame, the back frame further comprises a bracing piece that is fixed to the assembling pieces, wherein the at least two assembling pieces comprise at least two primary assembling pieces and at least one secondary assembling piece, the at least two primary assembling pieces are directly jointed with each other in an end-to-end manner to form a closed main frame structure of the back frame and define an opening wholly surrounded by the closed main frame structure, the at least one secondary assembling piece is arranged in the opening to divide the opening into a plurality of small openings, the bracing piece is arranged in the opening, each of the assembling pieces is mountable to at least two different positions of one end of the bracing piece in a lengthwise direction of the bracing piece, each of the assembling pieces is selectively mounted to one of the at least two different positions of one end of the bracing piece, and other different positions of one end of the bracing piece are idle; and the bracing piece is mountable to at least two different positions of one end of each of the assembling pieces in a lengthwise direction of the assembling piece, the bracing piece is selectively mounted to one of the at least two different positions of one end of each of the assembling pieces, and other different positions of one end of each of the assembling pieces are idle;

wherein the at least two primary assembling pieces comprise a first primary assembling piece, a second primary assembling piece, a third primary assembling piece and a fourth primary assembling piece, an end of the first primary assembling piece is joined to an end of the second primary assembling piece, another end of the second primary assembling piece is joined to an end of the third primary assembling piece, another end of the third primary assembling piece is joined to an end of the fourth primary assembling piece, and another end of the fourth primary assembling piece is joined to another end of the first primary assembling piece in order to form the rectangular main frame structure;

wherein both ends of the first primary assembling piece have at least two joint sections that are arranged to space from each other in a lengthwise direction of the first primary assembling piece, both ends of the third primary assembling piece have at least two joint sections that are arranged to space from each other in a lengthwise direction of the third primary assembling piece, each of the joint sections has a structure mating any end of both ends of the second primary assembling piece or any end of both ends of the fourth primary assembling piece, the first primary assembling piece using one of the joint sections to join the corresponding end of the second primary assembling piece, the first primary assembling piece using another one of the joint sections to join the corresponding end of the fourth primary assembling piece, other joint sections of the first primary assembling piece that are located outward of the joining location of both the second primary assembling piece and the fourth primary assembling piece are trimmed off, and the third primary assembling piece using one of the joint sections to join the corresponding another end of the second primary assembling piece, the third primary assembling piece using another one of the joint sections to join the corresponding another end of the fourth primary assembling piece, other joint sections of the third primary assembling piece that are located outward of both the second primary assembling piece and the fourth primary assembling piece are trimmed off to obtain a desired size of the back frame;

wherein the joint sections are recesses defined at a surface of the first primary assembling piece or the third primary assembling piece, the recesses do not extend through opposite surfaces of the first primary assembling piece or the third primary assembling piece, whereby the both ends of the second primary or the both ends of the fourth primary assembling piece assembling piece are movable within the joint sections.

2. The back frame as claimed in claim 1, wherein the bracing piece forms at least two first through holes at one end of the bracing piece, which are spaced in the lengthwise direction of the bracing piece, or at least a first elongate through hole at one end of the bracing piece, which is extended in the lengthwise direction of the bracing piece, the back frame further comprises a fastener for fixing the bracing piece and each of the assembling pieces, and the fastener is positionable in any one of the at least two first through holes or at different positions within the first elongate through hole such that the fastener is selectively positioned in one of the at least two first through holes, and other first through holes are idle; or the fastener is selectively positioned at one of the different positions within the first elongate through hole, and other different positions within the first elongate through hole are idle.

3. The back frame as claimed in claim 2, wherein each assembling piece forms at least two second through holes at one end of the assembling piece, which are spaced in the lengthwise direction of the assembling piece, or at least a second elongate through hole at the one end of the assembling piece, which is extended in the lengthwise direction of the each assembling piece, and the fastener is positionable in any one of the at least two second through holes or at different positions within the second elongate through hole such that the fastener is selectively positioned in one of the at least two second through holes, and other second through holes are idle; or the fastener is selectively positioned at one of the different positions within the second elongate through hole, and other different positions within the second elongate through hole are idle.

4. The back frame as claimed in claim 1, wherein the bracing piece comprises at least two bracing members, the at least two bracing members being joined to form the bracing piece, wherein at least one of the bracing members is mountable to at least two different positions of another bracing member in the lengthwise direction of the bracing piece.

5. The back frame as claimed in claim 4, wherein the another bracing member forms at least two through holes that are spaced in the lengthwise direction of the bracing piece, the bracing piece further comprises a fastener, the fastener being positionable in any one of the at least two through holes and fixing the another bracing member to the at least one of the bracing members.

6. The back frame as claimed in claim 4, wherein the another bracing member forms an elongate through hole in the lengthwise direction of the bracing piece, the bracing piece further comprises a fastener, the fastener being positionable at different positions within the elongate through hole and fixing the another bracing member to the at least one of the bracing members.

7. The back frame as claimed in claim 1, wherein the second primary assembling piece has a surface forming protrusions at corresponding positions, the protrusions being receivable in the recesses to join the first primary assembling piece and the second primary assembling piece to each other.

8. A backlight system, comprising a light source, a light homogenization mechanism, and a back frame; wherein
the back frame carries the light source and the light homogenization mechanism, the back frame being a back frame claimed in claim 1.

9. The back frame as claimed in claim 7, wherein the secondary assembling piece comprises a first secondary assembling piece and a second secondary assembling piece, an end of the first secondary assembling piece is joined to the first primary assembling piece and another end of the first secondary assembling piece is joined to the third primary assembling piece; and an end of the second secondary assembling piece is joined to the first primary assembling piece and another end of the second secondary assembling piece is joined to the third primary assembling piece, further, the second primary assembling piece, the fourth primary assembling piece, the first secondary assembling piece, and the second secondary assembling piece are arranged parallel to each other.

10. The back frame as claimed in claim 7, wherein the first primary assembling piece and the third primary assembling piece are of the same size and shape so that they are made by stamping with the same mold, the second primary assembling piece, the fourth primary assembling piece, the first secondary assembling piece, and the second secondary assembling piece are of the same size and shape so that they are made by stamping with the same mold, making it to share the mold.

11. The back frame as claimed in claim 7, wherein the bracing piece is further provided with bumps so that the back frame fixes circuit boards.

12. A back frame of a flat panel display device, wherein the back frame comprises at least two assembling pieces, the at least two assembling pieces being joined to form the back frame, the back frame further comprises a bracing piece that is fixed to the assembling pieces, wherein the at least two assembling pieces comprise at least two primary assembling pieces and at least one secondary assembling piece, the at least two primary assembling pieces are directly jointed with each other in an end-to-end manner to form a closed main frame structure of the back frame and define an opening wholly surrounded by the closed main frame structure, the at least one secondary assembling piece is arranged in the opening to divide the opening into a plurality of small openings, the bracing piece is arranged in the opening, each of the assembling pieces is mountable to at least two different positions of one end of the bracing piece in a lengthwise direction of the bracing piece, each of the assembling pieces is selectively mounted to one of the at least two different positions of one end of the bracing piece, and other different positions of one end of the bracing piece are idle; and the bracing piece is mountable to at least two different positions of one end of each of the assembling pieces in a lengthwise direction of the assembling piece, the bracing piece is selectively mounted to one of the at least two different positions of one end of each of the assembling pieces, and other different positions of one end of each of the assembling pieces are idle;
wherein the at least two primary assembling pieces comprise a first primary assembling piece, a second primary assembling piece, a third primary assembling piece and a fourth primary assembling piece, an end of the first primary assembling piece is joined to an end of the second primary assembling piece, another end of the second primary assembling piece is joined to an end of the third primary assembling piece, another end of the third primary assembling piece is joined to an end of the fourth primary assembling piece, and another end of the fourth primary assembling piece is joined to another end of the first primary assembling piece in order to form the rectangular main frame structure;
wherein both ends of the first primary assembling piece have at least two joint sections that are arranged to space from each other in a lengthwise direction of the first primary assembling piece, both ends of the third primary assembling piece have at least two joint sections that are arranged to space from each other in a lengthwise direction of the third primary assembling piece, each of the joint sections has a structure mating any end of both ends of the second primary assembling piece or any end of both ends of the fourth primary assembling piece, the first primary assembling piece using one of the joint sections to join the corresponding end of the second primary assembling piece, the first primary assembling piece using another one of the joint sections to join the corresponding end of the fourth primary assembling piece, other joint sections of the first primary assembling piece that are located outward of the joining location of both the second primary assembling piece and the fourth primary assembling piece are trimmed off, and the third primary assembling piece using one of the joint sections to join the corresponding another end of the second primary assembling piece, the third primary assembling piece using another one of the joint sections to join the corresponding another end of the fourth primary assembling piece, other joint sections of the third primary assembling piece that are located outward of both the second primary assembling piece and the fourth primary assembling piece are trimmed off to obtain a desired size of the back frame;
wherein the joint sections are recesses defined at a surface of the first primary assembling piece or the third primary assembling piece, the recesses do not extend through opposite surfaces of the first primary assembling piece or the third primary assembling piece, whereby the both ends of the second primary or the both ends of the fourth primary assembling piece assembling piece are movable within the joint sections;
wherein the secondary assembling piece comprises a first secondary assembling piece and a second secondary assembling piece, an end of the first secondary assembling piece is joined to the first primary assembling piece and another end of the first secondary assembling piece is joined to the third primary assembling piece; and an end of the second secondary assembling piece is joined to the first primary assembling piece and another end of the second secondary assembling piece is joined to the third primary assembling piece, further, the second primary assembling piece, the fourth primary assembling piece, the first secondary assembling piece, and the second secondary assembling piece are arranged parallel to each other;

wherein the bracing piece is further provided with bumps so that the back frame fixes circuit boards.

* * * * *